Patented Sept. 12, 1922.

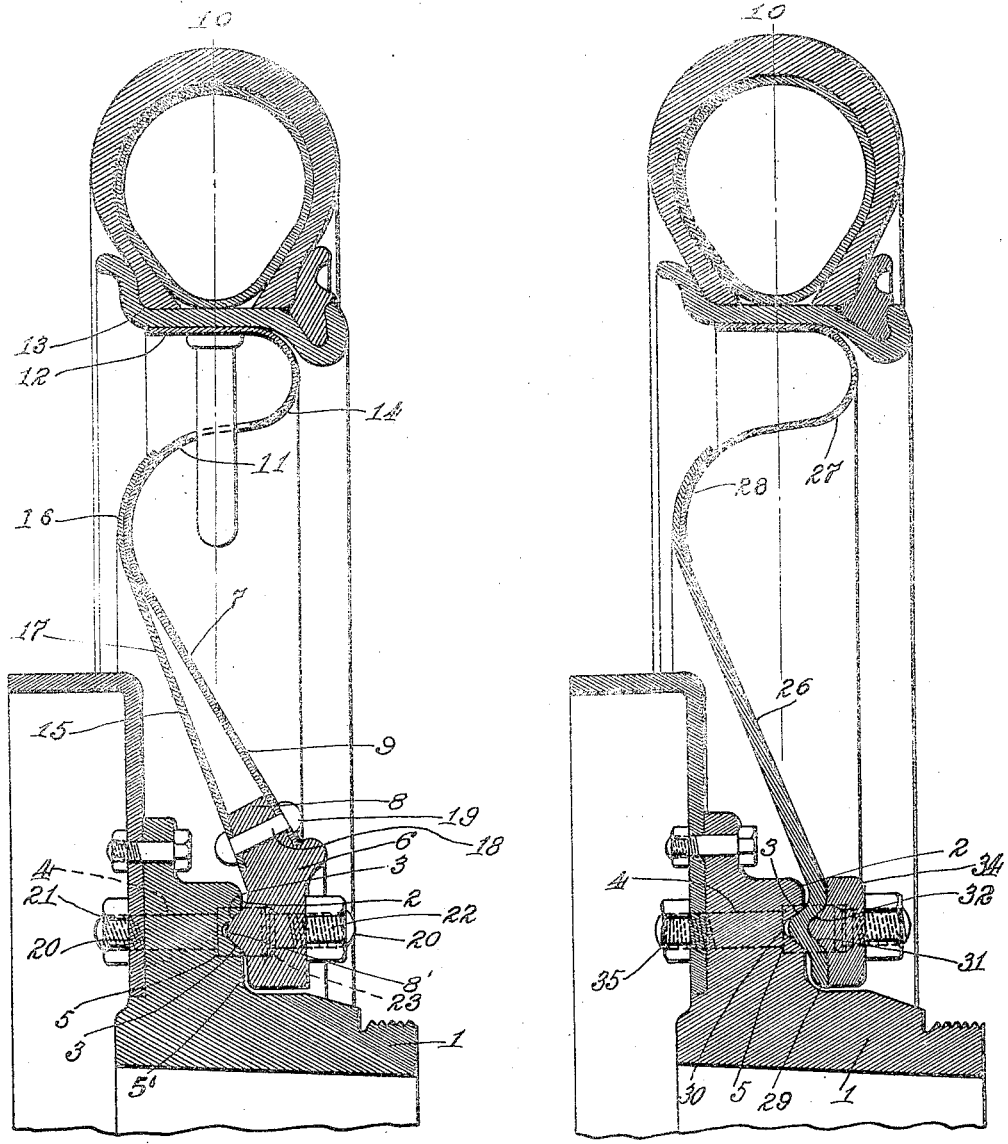

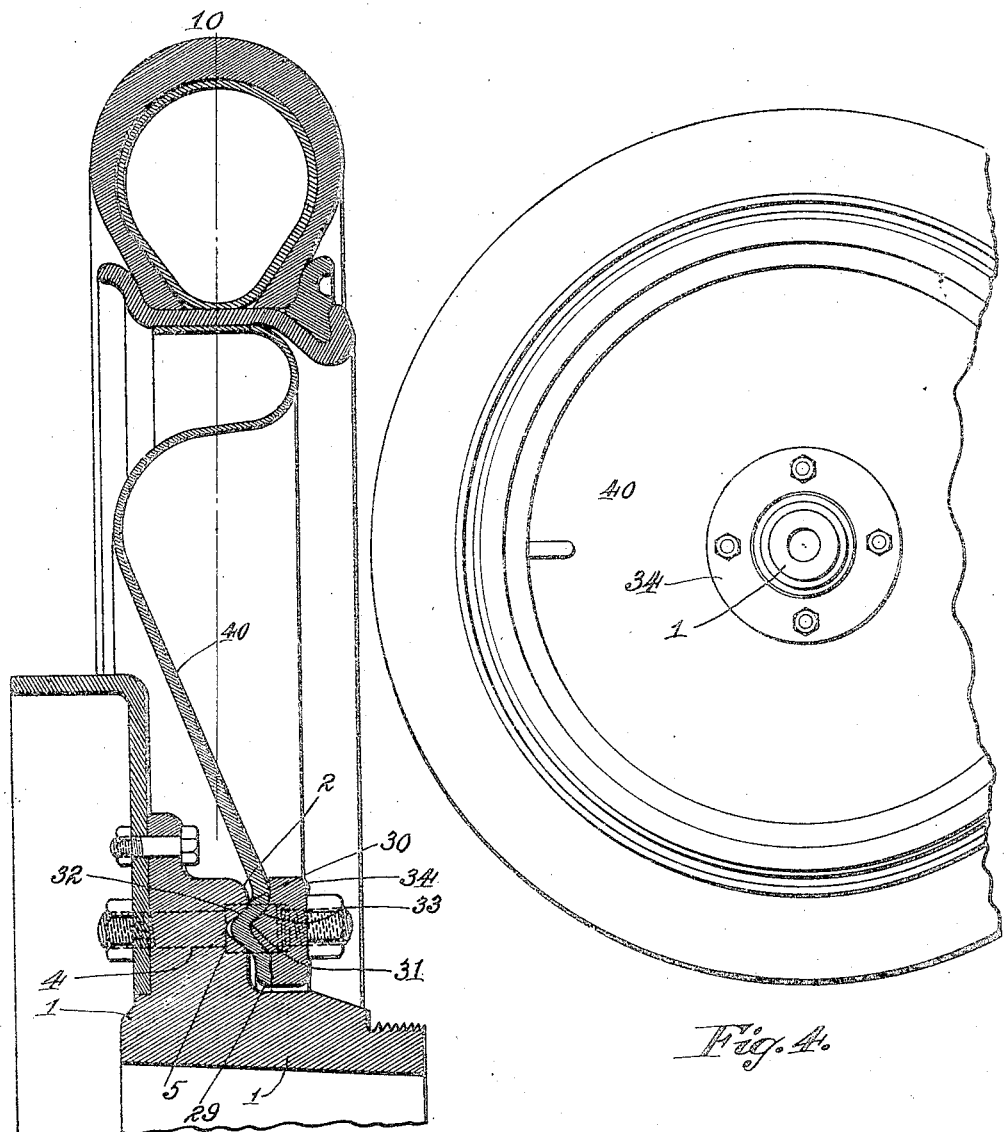

1,428,741

UNITED STATES PATENT OFFICE.

ROBERT P. ALLISON, OF BALTIMORE, MARYLAND.

DISK WHEEL.

Application filed July 23, 1919. Serial No. 312,804.

*To all whom it may concern:*

Be it known that I, ROBERT P. ALLISON, a citizen of the United States of America, residing in the city of Baltimore, State of Maryland, have invented certain new and useful Improvements in Disk Wheels, of which the following is a specification.

This invention relates to the type of disk wheel described in my co-pending application for United States Patent, Serial No. 274,719, the object being to provide an improved means for securing the disk portion to the hub and otherwise improve the construction along the general lines laid down in my aforesaid application. In the various types of disk wheels now on the market, the inner periphery of the disk is usually fastened to a shoulder on the hub by ordinary studs or by studs having counter-sunk heads. To be secure, the fastening must be absolutely rigid in the sense that there is no play whatever between the parts.

The fastening means, which is a feature of applicant's invention, is of the demountable type, in that it makes the disk conveniently separable from the hub, so that the spare tire may to advantage be carried mounted on a spare disk and applied by changing the disk. The fastening which is the subject of the invention referred to consists of an elongated substantially circularly arranged wedge shaped projection on one member entering a similarly elongated wedge shaped channel or groove on the other said member.

The applicant in the present instance has provided a thickened, reinforced portion or ring surrounding the central aperture in the disk in which the hub is to be seated. On this reinforced or thickened portion or ring is a tapered or wedgeshaped bead or ridge arranged in a circle concentric with the axis of the hub and disk. Co-operating with the circularly arranged ridge or bead is a circularly arranged channel or socket in the hub surface. This is preferably of tapering cross-section substantially equal to the cross-section of the bead, it being understood that the altitude of the ridge or bead and the depth of the socket are parallel to the axis of the wheel.

In the preferred form of the invention the parts have clearance at the apex and at the base of the bead or ridge, so that the inclined surfaces only of the two parts contact and these co-operate in a strictly wedgelike manner, giving a peculiarly rigid and positive connection when the wheel is assembled.

In one form of the invention the disk is made of two comparatively light pieces of sheet steel and the central ring or support is of steel or cast iron. The bead is formed on the ring and the ring being bolted to a convenient face of the hub having a correspondingly tapering aperture, the fastening is complete.

In other instances the disk is made of a sheet or sheets of metal thickened near the center. Under such circumstances the bead may be stamped in the sheet itself, i. e., the sheet being stamped in the form of a bead surrounding the central aperture. Under these circumstances a locking ring or bearing ring having, a similar bead to fit the channel formed in the plate in stamping the beads to maintain the form of the sheet metal is used, the ring and the disk being bolted to the hub by a single set of studs. The disk itself, which is an important feature of the invention, has a frusto-conical central portion and a reverse curved peripheral portion, the reverse curved portion and the frusto-conical portion being intersected, near their central zones, by the central plane of the tread. Preferably, the disk is of increasing thickness toward the centre.

In the accompanying drawing I have illustrated a plurality of forms of disk wheels embodying my invention and showing the manner of its application.

Figure 1 is a section through what is considered the preferred form of wheel, the section being taken on the plane of the axis and radius.

Figure 2 is a similar section of a modified form illustrating a different application and including a disk of different formation from any previously illustrated in connection with this type of wheel.

Figure 3 is a similar view showing still another form, the principal difference being that the disk is made of a single piece of metal.

Figure 4 is a side elevation of the wheel.

Referring to the drawing by numerals, the wheel includes any preferred or convenient hub structure indicated by reference character 1, the same having a circular face or shoulder 2 at right angles to the axis, the said flat surface or shoulder being formed with a circular groove or indentation 3 of cross-section tapering toward the bottom. Suitably spaced along the groove are bolt or stud holes 4 preferably shouldered at 5 so that the end of the hole adjacent the disk is of greater diameter than that near the inner face of the hub.

As already stated, except for the essentials pointed out, the hub structure in general is immaterial and the applicant's construction may be applied to the front and rear wheels and to any type of bearing.

Referring particularly to Figure 1, I have shown a disk construction closely resembling that in my previous application in that it is a disk which, as viewed in a section, cut on a radial axial plane, is formed in a reverse curve, passing twice and preferably three times through the central plane of rotation 10 which is the central plane of the tire. Otherwise, the disk has a sharp, full, reverse curve adjacent the periphery, with a shallow or obtuse reinforced conical portion near the centre, so that the centre where the greatest stresses occur is rigid while the periphery has a certain resiliency which permits it to yield to the necessary degree, giving to the wheel an elasticity which corresponds to that of a wooden wheel.

The form of wheel illustrated in Figure 1 in the present application differs from that in the previous application in that while the central portion of the wheel is formed of two sheets of metal diverging toward the centre to give increased rigidity at this point owing to the separation of the points of support of the two disks, the degree of separation of the two sheets adjacent the hub is much less in the present instance than in the previous.

More particularly, there is a sheet metal disk 7 centrally apertured and secured adjacent the aperture to the outer face of a peripheral rib 8 on a heavy metal supporting ring 6. From this ring the disk extends outward in the form of a shallow cone 9 which starts on the outside of the central plane 10 of rotation and passes through this plane to a considerable distance on the inside of said plane of rotation. The outer zone of the disk is formed in a reverse curve 11 which passes back through the plane of rotation, and again turning, is formed at its periphery in a flat, cylindrical flange 12 which serves as a felly and seat for the rim 13. The reverse curve and particularly the sharp bend at 14 gives to the disk the necessary resiliency. The reinforce 15, being shown as of less diameter, is joined at its periphery to the inner face of the disk 7 preferably at the first bend of the reverse curve, being riveted or spot-welded at 16, and extends inward in the form of a shallow cone 17, diverging slightly from the conical portion of the outer disk. This disk is apertured centrally, and the periphery of the aperture is secured to the inner face of the rib or flange 8 of the ring 6, which rib as shown is inclined in the direction of the slope of the conical part of the disks. The two pieces of sheet metal are in fact secured to the opposite faces of the rib 8 by means of rivets or bolts 18, each passing through the rib and through both metal sheets and having heads 19. The ring 6 as already suggested has a tapering ridge or bead 5 circularly arranged to enter and cöoperate with the groove 3 in the hub. It should be noted as to the co-operating faces of the ring 6 with the hub 3 that the parts are formed to provide a clearance between the surfaces of the two parts both at the point of the bead at 8' and between the surfaces adjacent the base of the bead at 5'; preferably, the only point of contact between the hub and the ring 6 is at the converging sides of the bead, so that the engagement between the parts is entirely the co-operation of a tapering wedge and a tapering socket. This wedge-like engagement is maintained by means of studs 20 in the shouldered apertures 4, 5. The studs are correspondingly shouldered, being thrust into the aperture in the hub and fastened by means of the nuts 21, when the disk, which is suitably apertured to receive the opposite ends of the studs, is passed over the projecting ends of these studs on the outer surface of the hub and fastened by means of nuts 22. It will be noted that the studs are shouldered or reduced at the outer as well as the inner end at 23, the shoulders being preferably bevelled as indicated. The central enlargement provides resistance to driving torque.

In Figure 2 I have shown a wheel consisting of a single, central, conically formed sheet or disk and a thin reverse curved peripheral member 27, the two being secured together along the inner zone of the reverse curve at 28, the securing means being either spot-welding or riveting as preferred. The disk 26 has a central aperture 29 for the hub. This disk has already been referred to as tapered, as a matter of fact it tapers in the sense that the thickness is increased from the periphery toward the centre. This gives an effect in a measure corresponding to the two diverging members 7, 15 in the previous figure, i. e., excess rigidity near the centre of the wheel. In the present instance the portion of the disk adjacent the central aperture, instead of being cast or drop forged with a solid bead or rib, as in the previous structure, is stamped to form a hollow bead 30 on the inner or rear face of the disk with a corresponding groove or channel 31 on the outer face of the disk surrounding the opening. This bead 30 fits in a circular groove or channel of tapering cross-section indicated by reference character 32 in the hub, the same being circularly arranged and concentric with the axis of the hub. Fitting the groove 31, formed by distorting the plate for the purposes of forming the bead 30, is a bead or rib 33 on a retaining ring 34 which overlies the periphery of the disk when secured to the hub. This ring is fastened by means of studs 35 similar in form and arrangement to the studs 20 in the previous figure.

In Figure 3 I have shown a wheel which in its principle of construction is similar to the wheel shown in Figure 2, that is, the reverse, curved disk portion 40 is like the corresponding portion of the wheel shown in Figure 2. It is of tapering and increasing thickness from the periphery to the centre, and the connection to the central ring is accomplished as in the previous structure, that is, the disk is stamped adjacent the central aperture to form a hollow bead or ridge 30 with a corresponding groove 31 on the outer face of the disk, the bead or rib 30 fitting in a corresponding, circular groove or channel 32 in the hub, and there is a retaining ring 34 with a rib 33 which overlies the inner periphery of the disk around the opening, the rib 33 fitting in the groove 31 which is formed by the distortion of the disk in the formation of the bead 30. The distinguishing feature of this structure by which it differs from that shown in Figure 2 is the formation of the disk 40 in a single piece, the radial cross-section of which is tapered, i. e., reduced in thickness from the central aperture to the peripheral zone.

The construction and operation have, it is believed, been made clear in connection with the description of the form of the device. The invention includes a wheel construction consisting of a sheet metal disk having a frusto-conical centre and a reverse curved periphery, the frusto-conical portion and the reverse curved portion, respectively, being intersected, near their central zones, by the central plane of the tread, so as to distribute the stresses equally and eliminate the cantilever effect, tending, in some instances, to tear the disk from the hub, the disk also having a central aperture for the hub and preferably with fastening means of the demountable type connecting the disk to the hub consisting of a circularly arranged wedge shaped projection on one member concentric with the axis to co-operate with a corresponding wedge-shaped circular channel in the other member.

In the preferred form the disk member is tapered and reduced in thickness from a point adjacent the aperture to the periphery.

Preferably the reverse curve portion adjacent the periphery is turned sharply backward on a small radius, a portion of which is nearly parallel to the cylindrical outer edge, the parallel portion having an aperture for the valve cap through which it is inserted when fastened in place on the valve stem, the same being therefore as conveniently accessible or even more conveniently than in the case of a wood, wire, or iron spoke wheel.

I have thus described specifically and in detail a preferred form and certain modified forms of my invention in order that the preferred construction and obvious variations thereof may be clearly understood; however, the specific terms herein are used descriptively rather than in their limiting sense, the scope of the invention being defined in the claims.

What I claim and desire to secure by Letters Patent is:

1. In a wheel for road vehicles, having a hub and a demountable sheet metal supporting member therefor, means for demountably connecting the hub to the sheet metal member, consisting of a circularly arranged wedge and a correspondingly shaped channel, circularly arranged to receive the wedge; and means for drawing the wedge into the channel to hold the parts in rigid engagement.

2. In a wheel for road vehicles, a hub, a disk having a central, conical portion, and a peripheral reverse curved portion, the conical portion and the reverse curved portion bein intersected intermediately, near their central zones, by the central plane of the tread, the thickness of the disk increasing toward the centre.

3. In a wheel for road vehicles, a hub, a disk having a central, conical portion and a peripheral reverse curved portion, both of said portions being intersected, near their central zones, by the central plane of the tread, the disk having a central aperture to receive and admit the hub, demountable means for connecting the disk to the hub consisting of a circularly arranged wedge and a circularly arranged channel to receive the wedge.

4. In a wheel disk having a peripheral reverse curved portion intersected intermediately by the central plane of the tread, a central conically arranged portion of increasing thickness toward the centre and means for securing the disk to a hub.

5. A wheel disk having a peripheral reverse curved portion, a central conically arranged portion of increasing thickness toward the centre, said portions being substantially equally distributed on opposite sides of the central plane of the tread; and demountable means for securing the disk to a hub, consisting of circularly arranged wedge surfaces.

6. In a wheel for road vehicles, a hub, a sheet metal hub supporting member, means for demountably securing the sheet metal member to the hub consisting of a circularly arranged wedge carried by the sheet metal member, a circularly arranged wedge shaped channel on the hub, and studs parallel to the axis passing through both members to hold the wedge in the channel.

7. In a wheel for road vehicles, a hub, a sheet metal hub supporting member, means for demountably securing the sheet metal member to the hub consisting of a circularly arranged wedge carried by the sheet metal member, a circularly arranged wedge shaped channel on the hub, the parts having clearance at the apex of the wedge and at the base of the wedge, and means for drawing the parts together to force the wedge into the channel.

8. In a road vehicle wheel, a hub and a sheet metal supporting member for the hub, means for demountably securing the sheet metal member to the hub consisting of an elongated wedge and a corresponding elongated wedge shaped channel, means for drawing the parts together to force the wedge into the channel, the parts having clearance at the apex of the wedge and the base of the wedge.

9. In a road vehicle, a hub and a demountable sheet metal supporting member for the hub, means for demountably securing the sheet metal member to the hub consisting of an elongated wedge and a correspondingly arranged elongated wedge shaped channel to receive the wedge, and means for drawing the parts together to force the wedge into the channel.

10. In a wheel for road vehicles, a hub; a disk adapted to be secured to and extending outward from the hub, the disk having a central frusto-conical portion and a peripheral reverse curved portion, the said respective portions being intersected, near their respective central zones, by the central plane of the tread.

11. The combination with a hub, of a disk wheel mounted over said hub, an annular depression in said disk wheel adapted to be engaged by said hub for increasing the fixed bearing surfaces, and a plurality of bolts extending through said annular depression and hub for locking said wheel in position thereon and permitting its removal therefrom.

Signed by me at Baltimore, Maryland, this 22nd day of July, 1919.

ROBERT P. ALLISON.

Witnesses:
EMMA AHLSLEGER,
EMMA WEHMEYER.